(12) United States Patent
Thoreau et al.

(10) Patent No.: US 7,702,168 B2
(45) Date of Patent: Apr. 20, 2010

(54) MOTION ESTIMATION OR P-TYPE IMAGES USING DIRECT MODE PREDICTION

(75) Inventors: Dominique Thoreau, Cesson Sevigne (FR); Edouard Francois, Bourg des Comptes (FR); Pierre Ruellou, Domloup (FR)

(73) Assignee: Thomson Licensing, Boulogne-Billancourt (FR)

( * ) Notice: Subject to any disclaimer, the term of this patent is extended or adjusted under 35 U.S.C. 154(b) by 1059 days.

(21) Appl. No.: 10/954,774

(22) Filed: Sep. 30, 2004

(65) Prior Publication Data

US 2005/0213828 A1 Sep. 29, 2005

(30) Foreign Application Priority Data

Oct. 1, 2003 (FR) ................... 03 50629

(51) Int. Cl.
*G06K 9/36* (2006.01)
*G06K 9/46* (2006.01)
(52) U.S. Cl. ...................... 382/236; 382/238
(58) Field of Classification Search ................. 382/236, 382/238
See application file for complete search history.

(56) References Cited

U.S. PATENT DOCUMENTS

| 6,043,846 | A | * | 3/2000 | Shen et al. ............... 348/409.1 |
| 6,097,842 | A | * | 8/2000 | Suzuki et al. .............. 382/232 |
| 6,654,420 | B1 | * | 11/2003 | Snook .................... 375/240.16 |
| RE38,563 | E | * | 8/2004 | Eifrig et al. ................ 382/236 |
| 7,031,387 | B2 | * | 4/2006 | Jeon ....................... 375/240.15 |
| 7,233,621 | B2 | * | 6/2007 | Jeon ....................... 375/240.15 |
| 7,362,807 | B2 | * | 4/2008 | Kondo et al. ............. 375/240.16 |
| 2002/0181591 | A1 | * | 12/2002 | Francois et al. .......... 375/240.16 |
| 2004/0052507 | A1 | * | 3/2004 | Kondo et al. ................ 386/111 |

FOREIGN PATENT DOCUMENTS

EP 1 347 649 3/2002
WO WO 03041415 A1 * 5/2003

OTHER PUBLICATIONS

"Working Draft No. 2, Revision 2 (WD-2)" Joint Video Team—JVT—of ISO-IEC MPEG and ITU-T VCEG. Document JVT-B118R2, Jan. 29, 2002, pp. 1-10 xp001086630 Geneva, CH.
Tourapis Alexis M.; Wu Feng; Li Shipeng: "Direct Mode Coding for Bi-Predictive Pictures in the JVT Standard" Proceedings of the 2003 IEEE International Symposium on Circuits and Systems, vol. 2, May 25, 2003 pp. 700-703, XP01189209.

* cited by examiner

*Primary Examiner*—Bhavesh M Mehta
*Assistant Examiner*—Bernard Krasnic
(74) *Attorney, Agent, or Firm*—Robert D. Shedd; Paul P. Kiel; Guy H. Eriksen

(57) ABSTRACT

The process for coding the current block comprises a step of selecting the predicted block from among candidate blocks, the selection being dependent on a difference $D^B_{drx,dry}$ between the co-located block of the current image block lying in an image of type B and the block of a reference image, the latter block being designated by the motion vector with components drx, dry which is allocated to co-located block and which is colinear with the motion vector Vp allocated to the current block and designating the candidate block. The process relates to data compression, the transmission of digital images using the video coding standard comprising a direct prediction mode, for example the h263, MPEG4 or h261 standard.

11 Claims, 1 Drawing Sheet

MOTION ESTIMATION OR P-TYPE IMAGES USING DIRECT MODE PREDICTION

This application claims the benefit, under 35 U.S.C. 119, of France patent application No. 0350629 filed Oct. 1, 2003.

FIELD OF THE INVENTION

The invention relates to a process and a device for the differential coding of an image block with predictive coding. It relates more particularly to coding processes or devices utilizing the "direct" mode. As explained later, the "direct" mode is a bidirectional mode of prediction utilizing motion compensation, the components of whose motion vectors are derived from the components of the motion vector used for the coding of the co-located macroblock of a subsequent predictive-coding image.

The field is that of video compression and most particularly that of the video coding of the MPEG 4 part 2 or part 10, H.263 and H.261 type.

BACKGROUND OF THE INVENTION

In data compression standards, for example of MPEG type, the images to be coded are generally images of intra and inter type and in the latter case, with predictive coding, of type P or with bidirectional predictive coding of type B. The term image is taken here within its broad sense and also encompasses the video object planes of which the image is composed, better known by the name VOP, standing for Video Object Plane.

Conventionally, the motion estimator contained in a coder is, firstly, invoked so as to extract the motion field of the type P image. Subsequently, after the coding of this P image, the motion estimator is called upon again for each of the B images, for the conventional forward, backward and bidirectional prediction modes. On completion of the various motion estimations of each of the B images, the coding is performed by choosing the best mode from among all the modes available, including the "temporal direct" mode, according to the criterion in force in the coder. This "temporal direct" mode, explained for example in paragraph 7.6.9.5. of the ISO/IEC 14496-2 standard, uses the motion vectors of the co-located macroblock in the most recently decoded type P image to perform the bidirectional prediction of the current macroblock in the type B image. The co-located macroblock is the macroblock lying at the same location, that is to say having the same vertical and horizontal index as the current macroblock of the P image.

FIG. 1 represents the motion prediction utilizing the direct mode.

Four successive images are represented in the order of display, that is to say before reordering, a first reference image of type I or P, a second and third image of type B and a fourth reference image of type P.

The prediction for the current macroblock MBp of the fourth image of type P, referenced 1, is the macroblock referenced 2 of the first image of type I or P. The corresponding motion vector MVp is referenced 3.

The co-located macroblock corresponding to the macroblock MBp for the second image, is referenced 4. The direct type prediction, for this macroblock belonging to the B image, gives a first macroblock MBfw in the first image and a second macroblock MBbck in the last image, these macroblocks referenced 5 and 6 respectively correspond to the forward motion vector $MV_F$ and to the backward motion vector $MV_B$ referenced 7 and 8 in the figure.

Although the motion vectors are generally allocated, in the MPEG standard, to macroblocks, the process can be applied to simple image blocks and therefore, hereinafter, no distinction will be made between image blocks and macroblocks.

By way of example, the traditional approach used during motion estimation making it possible to extract the vector of a block of a P image can be based on the technique of block matching, in a search window, by minimizing the sum of the absolute value of the inter-image differences as follows:

$$SAD^P_{dx,dy} = \left( \sum_{i,j=0}^{i,j=L} |P_{cur}(i,j) - IP_{prev}(i+dx, j+dy)| \right)$$

$$SAD^P_{Dx,Dy} = \text{Min}(SAD^P_{dx,dy})_{dx,dy=-N}^{dx,dy=N}$$

with:
i, j: row and column indices of the pixels contained in the block of size L*L, $P_{cur}(i,j)$: block of a current image of type P, $IP_{prev}(i,j)$: block of a previous (from the temporal point of view) image of type I or P, $SAD_{dx,dy}^P$: sum of the absolute value of the differences (the acronym standing for Sum of Absolute Differences) between the luminance values of the pixels of a block of a current image of type P and of a block displaced by dx, dy of a previous image of type I or P.

$SAD_{Dx,Dy}^P$: minimum value of $SAD_{dx,dy}^P$ over the set of image blocks in a search window of dimension 2N+1, 2N+1 and corresponding to a displacement Dx, Dy As far as the co-located block of the B image is concerned, said block is predicted according to the direct mode with the aid of the vectors $MV_F$ and $MV_B$ such that:

$$MBprd_{drc} = \left( \frac{MB_{bck} + MB_{fw}}{2} \right),$$

half-sum of the blocks $MB_{bck}$ and $MB_{fw}$, pixelwise, with:

$MB_{bck} = P_{next}(x_{bck}, y_{bck})$ in backward prediction mode.

$P_{next}(x_{bck}, y_{bck})$ signifies the prediction block belonging to the next P image, from the temporal point of view, whose position corresponds to that of the co-located block displaced by the vector with components $x_{bck}$, $y_{bck}$.

$MB_{fw} = IP_{prev}(x_{for}, y_{for})$ in forward prediction mode.

$IP_{prev}(x_{for}, y_{for})$ signifies the prediction block belonging to the previous I/P image, whose position corresponds to that of the co-located block displaced by the vector with components $x_{for}$, $y_{for}$.

$x_{bck}$, $y_{bck}$, components of the vector $MV_B$ which are derived from the components of the vector $MV_P$ of the co-located block $MB_P$.

$x_{for}$, $y_{for}$, components of the vector $MV_F$ which are derived from the components of the vector $MV_P$ of the co-located block $MB_P$.

The motion vectors $MV_B$ and $MV_F$ allocated to the co-located block, are the vectors colinear with the motion vector $MV_P$, pointing respectively into the next image of type P and into the previous image of type I or P, from which the co-located block originates.

MBprd$_{drc}$ is the prediction block of the B image in direct mode, calculated on the basis of the forward and backward prediction blocks.

In such an approach, the motion estimation and the choice of the mode of prediction of the blocks MB of the P images are carried out independently of the content of the previous, from the temporal point of view, B images. The coding, that is to say the data compression, is consequently not optimal for these images of bidirectional type.

SUMMARY OF THE INVENTION

An aim of the invention is to alleviate the aforesaid drawbacks. Its subject is a process for the differential coding of a current image block in a first reference image on the basis of a predicted image block in a second reference image, the reference images flanking one or more images of bidirectional type or type B whose differential coding can take account of the blocks of these reference images, comprising a step of selecting the predicted block, from among candidate blocks, as a function of a difference $D^P_{dx,dy}$ between the current block and a candidate block designated by a motion vector Vp with components dx, dy which is allocated to the current block, wherein the selection is also dependent on a difference $D^B_{drx,dry}$ between the co-located block of the current image block in an image of type B and the block in a reference image, the latter block being designated by the motion vector, with components drx, dry, which is allocated to the co-located block and is colinear with the motion vector Vp.

According to a particular characteristic, the motion vector with components drx, dry is a backward motion vector between the image of type B and the first reference image or else a forward motion vector between the image of type B and the second reference image.

According to a particular characteristic, the selection takes into account the difference $D^B_{drxfw,dryfw}$ corresponding to the colinear motion vector with components $drx_{fw}$, $dry_{fw}$ between the image of type B and the second reference image as well as the difference $D^B_{drxbck,drybk}$ corresponding to the motion vector with components $drx_{bck}$, $dry_{bck}$ between the image of type B and the first reference image.

According to a particular characteristic, the selection is dependent on the difference $D^{Bo}_{drx,dry}$ corresponding to a colinear motion vector between the first image of type B, $B_o$, and a reference image as well as the difference $D^{B1}_{drx,dry}$ corresponding to a colinear motion vector between the second image of type B, $B_1$, and a reference image.

According to a particular characteristic, the block selected from among the candidate blocks corresponds to the minimum of a function of the difference values $D^P_{dx,dy}$ and $D^B_{drxfw,dryfw}$, $D^B_{drxbck,drybck}$ calculated for these candidate blocks.

According to a particular implementation, the difference is calculated on the basis of the sums of the absolute values of the differences (SAD) between the luminance values of the pixels of the blocks.

The advantages of the invention relate to the improving of the quality of the regulated throughput image as well as a lower cost at constant quality. The choice between several types of SAD, during the selection of the vectors of the P image, substantially increases the homogeneity of the motion field.

The process according to the invention performs an estimation of motion at the level of the block of the P image by considering not only the inter-image difference (SAD$^P$) inherent in the displacement vector but also the prediction error due to the mode of direct prediction of each co-located block in each of the images of type B lying between the two I/P, P images. The cost of coding of the blocks of the images of type B in direct mode is taken into account when choosing the motion vector of the co-located block of the image of type P.

The process makes it possible to favour, during the coding of the B images, the direct mode which generally represents the most economical mode for this type of image in terms of coding cost. This direct mode can, under certain conditions, lead to the "skipped macroblock" mode (for example described in §7.6.6 of the ISO 13818-2 standard) which is a mode of coding corresponding to a zero residual, at almost zero cost.

BRIEF DESCRIPTION OF THE DRAWINGS

Other features and advantages of the invention will become clearly apparent in the following description given by way of nonlimiting example and offered in conjunction with the appended drawings which represent.

DETAILED DESCRIPTION OF PREFERRED EMBODIMENTS

Figure 2:
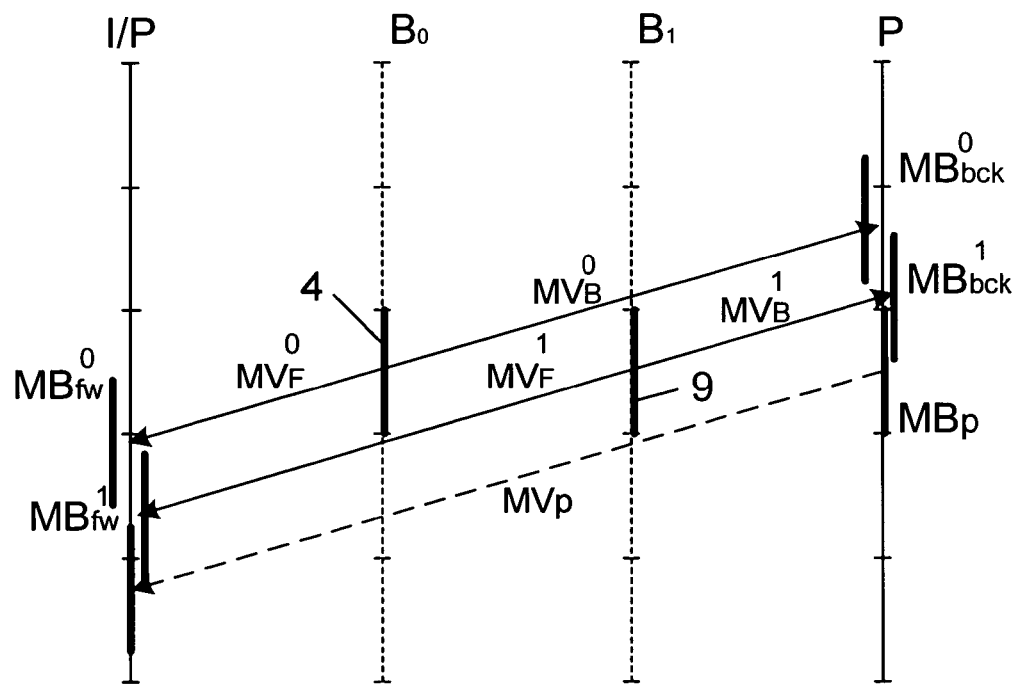
FIG. 2, a prediction of a block of an image $B_o$ and of an image $B_1$ utilizing the direct mode.

FIG. 2 represents the prediction for a current block MB$_p$ of a P image as well as the predictions of direct type for the co-located blocks belonging to the images of type B, a first image called $B_0$ and a second image called $B_1$.

The terms previously used are indexed zero or one depending on whether they relate to the first image $B_o$ or the second image $B_1$.

Thus, as far as the image $B_o$ is concerned, the motion vectors 7 and 8 are labelled $MV_F^0$ and $MV_B^0$ and respectively designate the predicted blocks $MB_{fw}^0$, $MB_{bck}^0$ for the reference images I/P and P.

The motion vectors corresponding to the image B1 are labelled $MV_F^1$ and $MV_B^1$ and respectively designate the predicted blocks $MB_{fw}^1$, $MB_{bck}^1$ for the reference images I/P and P.

In this context where two images of type B lie between the reference images I/P and P, on the basis of the calculation of the SAD, a conceivable criterion for selecting the motion vector MVp corresponding to the block of the P image becomes:

$$SAD_{Dx,Dy} = \text{Min}(SAD^P_{dx,dy} + SAD^{B0}_{drx,dry} + SAD^{B1}_{drx,dry})_{dx,dy=-N}^{dx,dy=N}$$

with:

$SAD^P_{dx,dy}$, the sum of the absolute value of the differences for a displacement dx, dy for the block of the P image, $SAD^{B0}_{drx,dry}$, the sum of the absolute value of the differences for the mode of prediction of direct type for the image $B_0$.

$SAD^{B1}_{drx,dry}$, the sum of the absolute value of the differences for the mode of prediction of direct type for the image $B_1$.

This criterion is said to be based on multiple SADs in so far as the choice of the vector intended for the P image is based on taking account of several prediction errors, that inherent in the prediction of the macroblock of the P image and those relating to the macroblocks of the B images.

For the first image of type B, Bo, and within the framework of the example illustrated by FIG. 2 where two B images lie between the two I/P, P images, the vectors with components drx, dry respectively take the values, as regards the forward and backward predictions of the direct mode:

$$drx_{fw}^0 = dx/3 \qquad dry_{fw}^0 = dy/3$$
$$drx_{bck}^0 = -2dx/3 \qquad dry_{bck}^0 = -2dy/3$$

and $$MBprd_{drc}^0 = \left(\frac{MB_{bck}^0 + MB_{fw}^0}{2}\right),$$

with:

$MB_{bck}^0 = P_{next}(drx_{bck}^0, dry_{bck}^0)$ in backward prediction mode $MB_{fw}^0 = I/P_{prev}(drx_{fw}^0, dry_{fw}^0)$ in forward prediction mode.

The value of SAD for the image $B_o$ is then:

$$SAD_{drx,dry}^{Bo} = \left(\sum_{i,j=0}^{i,j=L} |B_{cur}^o(i,j) - MB_{prd_{drc}}^o(i,j)|\right)$$

$B_{cur}^o(i, j)$ is the co-located block 4 of the image $B_o$ corresponding to the current block $MB_p$.

Similarly for the second image of type B, $B_1$, the value of $SAD_{drx,dry}^{B1}$ is obtained via the direct mode with the aid of the vectors:

$$drx_{fw}^1 = 2dx/3 \qquad dry_{fw}^1 = 2dy/3$$
$$drx_{bck}^1 = -dx/3 \qquad dry_{bck}^1 = -dy/3$$
$$SAD_{drx,dry}^{B1} = \left(\sum_{i,j=0}^{i,j=L} |B_{cur}^1(i,j) - MB_{prd_{drc}}^1(i,j)|\right)$$

$MB_{cur}^1$ is the co-located block 9 of the image $B_1$ corresponding to the current block $MB_p$ 1.

The above example, which makes it possible to illustrate the process, advocates that the selection of the vector Dx, Dy be made by utilizing the sum of the 3 SAD values;

$$SAD_{Dx,Dy} = \text{Min}(SAD_{dx,dy}^P + SAD_{drx,dry}^{B0} + SAD_{drx,dry}^{B1})_{dx,dy=-N}^{dx,dy=N}$$

where each SAD is endowed with the same weighting i.e. 1.

A first variant consists in weighting the SADs differently depending on the type of image, in so far as the sought-after vector relates mainly to the P image:

$$SAD_{Dx,Dy} = \text{Min}(\alpha \cdot SAD_{dx,dy}^P + \beta \cdot (SAD_{drx,dry}^{B0} + SAD_{drx,dry}^{B1}))_{dx,dy=-N}^{dx,dy=N}$$

Figure 1:
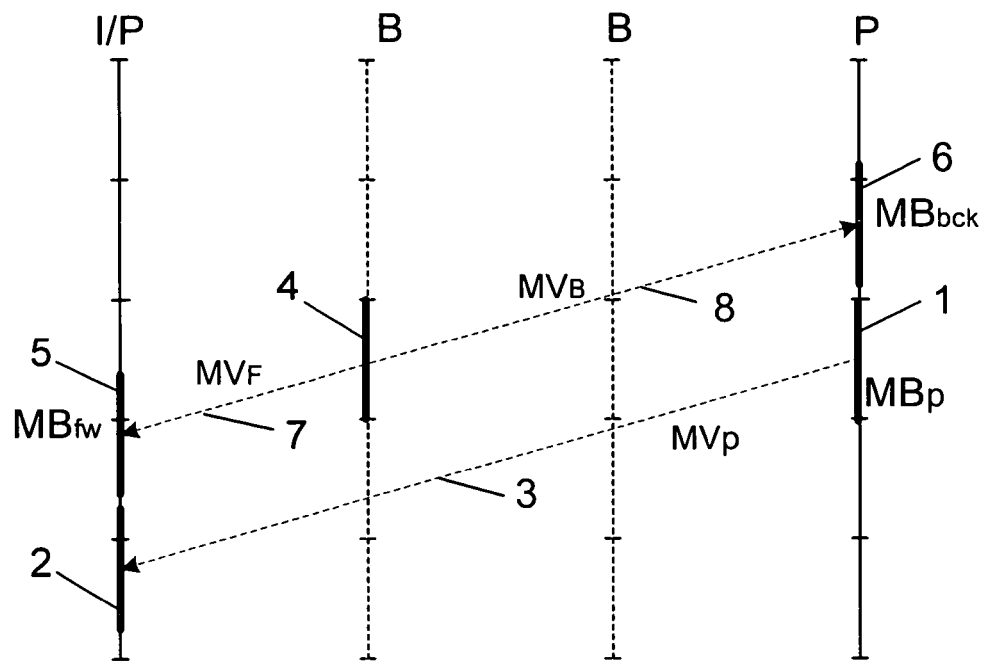
FIG. 1, a block prediction according to the direct mode.

$\alpha$ and $\beta$ being weighting coefficients, for example
$\alpha = 0.5$ $\beta = (1-\alpha)/(m-1)$ where m represents the period of the P images, that is to say the number of image periods or intervals between two P images. The example of FIGS. 1 and 2 corresponds, for m, to a value of 3.

A second variant consists in taking account of the displacement of momentary objects, appearing in B images and that may entail motions of the co-located blocks of these B images that differ from the corresponding blocks of the P and I/P images.

In the examples of 3 images of type B flanked by reference images, a calculation of SAD may be:

$$SAD_{Dx,Dy} =$$
$$\text{Min}(\alpha SAD_{dx,dy}^P + \beta Median(SAD_{drx,dry}^{B0}, SAD_{drx,dry}^{B1}, SAD_{drx,dry}^{B2}))_{dx,dy=-N}^{dx,dy=N}$$

with for example $\beta=(1-\alpha)$

"Median" corresponds to the median function which therefore rejects the extreme values of the SADs of the images of type B.

This criterion builds in the fact that $SAD^P$ must be small, but moreover makes it possible to search for the vector which minimizes a majority of the $SAD^B$s. The objective is to select a vector which corresponds to a compromise between a better prediction of the macroblock of the P image and to a lesser extent a better prediction of the co-located macroblocks of the B images and this criterion builds in the fact that a macroblock belonging to an image zone that cannot be predicted in a B image, via the temporal prediction, is rejected, so as not to bias the decision criterion. Within the B image, this unpredictable zone is coded subsequently, with the aid of other modes of coding, for example intra.

If there are only 2 B images, the Median function can be replaced by the Min function, which rejects the highest $SAD^B$.

The above examples and the variants proposed relate to block differences corresponding to values of SAD. They also relates to sums of these values of SAD.

The utilization of inter-block difference values of any type, in fact any value representative of the correlation between these blocks, is of course conceivable and does not depart from the field of the invention. One may be dealing with the values utilized during the block correlation calculation in respect of a motion estimation according to the prior art. One may be dealing with the sum, over a block, of the squares of the differences of the luminance values, pixelwise.

The utilization of any function f of the variables SAD or of the difference values, whose minimization corresponds to a reduction in the coding cost, also forms part of the field of the invention.

With the aim of generalization, this value of inter-block difference is therefore subsequently called D:

$D^P_{dx, dy}$ is the difference between the current block of the P image and the block predicted by the motion vector with components dx, dy.

$D^B_{drx, dry}$ is the difference between the co-located block of a B image and the block predicted by the direct motion vector with components drx, dry, more precisely $D^B_{drxfw, dryfw}$ when dealing with a forward direct vector with components $drx_{fw}, dry_{fw}, D^B_{drxbck, drybck}$ when dealing with the backward vector with components $drx_{bck}, dry_{bck}$.

The selection of a predicted block in the I/P image corresponding to a motion vector with components Dx, Dy, is then performed as a function of the values of difference between the current block of the P image and of the predicted blocks of the I/P image corresponding to motion vectors with component dx, dy, which are called $D^P_{dx,dy}$, but also, for each of these values, as a function of the value or values of difference $D^B_{drxfw,dryfw}$ between the co-located block of the images $B_0$ and/or $B_1$ and the predicted block matched in the I/P image on the basis of the motion vector colinear with the vector with components dx, dy, with components $drx_{fw}$, $dry_{fw}$, and as a function of the value or values of difference $D^B_{drxbck,drybck}$ between the co-located block of the images $B_0$ and/or $B_1$ and the block matched in the P image on the basis of the motion vector colinear with the vector with components dx, dy, with components $drx_{bck}$, $dry_{bck}$ $$drx_{bck} = -(dx - drx_{fwd}),$$

$$dry_{bck} = -(dy - dry_{fwd}).$$

$$D_{Dx,Dy} = \text{Min}(f(D^P_{dx,dy}, D^B_{drxfw,dryfw}, D^B_{drxbck,drybck})))^{dx,dy=N}_{dx,dy=-N}$$

f is any function, for example an affine function.

These values of differences do not necessarily relate directly to the luminance and/or chrominance blocks of the images. One may for example be dealing with the sum of the absolute value of the coefficients of the Fourier or Hadamard transform of the pixels of the differences, that is to say a residual block. The Hadamard transform used being a two-dimensional transformation of the residual image signal, for example of 4×4 or 8×8 pixels, the advantage of this transform is that of switching into the spectral domain by coming closer to the DCT domain while using decomposition coefficients of values +1 and −1. These coefficients make it possible to perform an entire calculation faster.

A bias can be added to these differences to take account of the potential coding cost of the motion vectors under test within the motion estimator.

The motion estimation implemented in the invention is of course not limited to the block matching process. It may be of any kind for example of recursive PEL type, estimation performed at the level of the pixel of the image or of hierarchical type, the estimation then being performed on images of increasing resolution. It may utilize the luminance, the chrominance, the gradient function, etc.

The block matching may be of "full search" type, taking the multiple SAD minimization criterion. The search for the correlated block is then made in a predefined search window, each new block of the search window, for which block a measurement of correlation and of SAD calculation is performed, corresponding to a horizontal or vertical translation of amplitude 1 pixel, of the block previously processed.

Another variant of the invention consists in performing an estimation of motion between the P and I/P images and selecting, for the current macroblock MBp, the K most relevant motion vectors providing for example the smallest values of $SAD^P$ or difference values. Thereafter, on the basis of these K vectors, the process selects the vector minimizing the criterion based on the multiple SADs or difference values. For example, K is equal to 8 and the vector selected is that which minimizes the sum of the SADs.

The calculation of the SADs or difference values may be performed between the B images and the source I or P image, which is the previous image when considering the order of coding. It may also be performed between the B images and the local decoded I or P image.

The invention relates to all motion estimation devices utilizing such a process or all compression or coding systems using such motion estimation devices.

Applications relate inter alia to the transmission of digital images using the video coding standard comprising a direct prediction mode, for example the h263, MPEG4 or h261 standard.

What is claimed is:

1. A process for a differential coding of a current image block in a first reference image on a basis of a predicted image block in a second reference image, the reference images flanking one or more images of bidirectional type or type B whose differential coding can take account of the blocks of these reference images, comprising steps of using a coding device to perform:

calculating, for a candidate block in the second reference image, a difference between the current block and the candidate block designated by a motion vector Vp which is allocated to the current block;

calculating, for said candidate block, a difference between a co-located block of the current image block in an image of type B and the block in a reference image, the latter block being designated by a colinear motion vector, which is allocated to the co-located block and is colinear with the motion vector Vp;

selecting a predicted image block as the one, among the candidate blocks, minimizing a function of at least the two calculated differences, to give a selected predicted image block; and differential coding of the current image block by using said selected predicted image block.

2. The process according to claim 1, wherein the colinear motion vector is a backward motion vector between the image of type B and the first reference image.

3. The process according to claim 1, wherein the colinear motion vector is a forward motion vector between the image of type B and the second reference image.

4. The process according to claim 1, wherein the selecting step minimizes a function of three calculated differences, a difference between the current block and the candidate block, a difference between the co-located block and a block in the second reference image corresponding to a first colinear motion vector between the image of type B and the second reference image, and a difference between the co-located block and a block in the first reference image corresponding to a second colinear motion vector between the image of type B and the first reference image.

5. The process according to claim 1, the reference images flanking two images $B_0$ and $B_1$ of bidirectional type, wherein the selecting step minimizes a function of:

a difference between the current block and the candidate block, a difference between a co-located block within $B_0$ and a block in a reference image corresponding to a first colinear motion vector between the first image of type B, $B_o$, and a reference image, and a difference between a co-located block within $B_1$ and a block in a reference image corresponding to a second colinear motion vector between the second image of type B, $B_1$, and a reference image.

6. The process according to claim 1, wherein a difference is calculated on a basis of sums of absolute values of differences (SAD) between the luminance values of the pixels of the blocks.

7. The process according to claim 1, wherein a difference is calculated on a basis of sums of absolute values of coefficients of a transform of a residual which is a pixelwise difference between the luminance values of the pixels of the blocks.

8. The process according to claim 1, wherein the candidate blocks are image blocks of a same size as the current block, that can be extracted from a predefined search window.

9. The process according to claim 1, wherein one of the coding modes of images of the B type is a temporal direct mode of the MPEG 4 standard.

10. The process according to claim 1, wherein said function is an affine function.

11. The process according to claim 10, wherein said affine function is a weighted sum of the differences.

* * * * *